Figure 1:
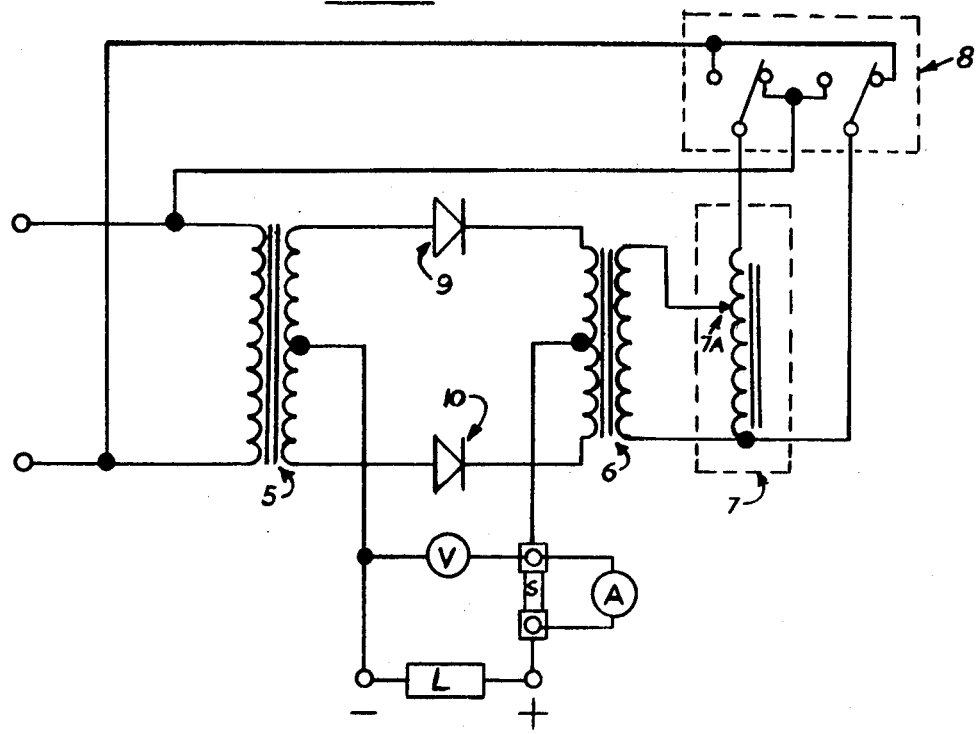

United States Patent [19]

Kljucaricek

[11] Patent Number: 4,476,521
[45] Date of Patent: Oct. 9, 1984

[54] PERIN RECTIFIER APPARATUS

[76] Inventor: Peter Kljucaricek, 30814 Morosso, Warren, Mich. 48093

[21] Appl. No.: 500,164

[22] Filed: Jun. 1, 1983

[51] Int. Cl.³ .............................................. H02M 7/00
[52] U.S. Cl. .................................... 363/101; 323/344
[58] Field of Search ................ 323/259, 344; 363/101

[56] References Cited

U.S. PATENT DOCUMENTS 2,774,932  12/1956  Patton .................................. 363/126

FOREIGN PATENT DOCUMENTS 200016  11/1955  Australia .............................. 363/101
872115  1/1942  France ................................... 363/126

Primary Examiner—William M. Shoop
Attorney, Agent, or Firm—William L. Fisher

[57] ABSTRACT

Improvement in a regulated D.C. power supply having a conventional main transformer with a center tap secondary and rectifying elements, the improvement comprising a buck-boost transformer, and a regulating device, the buck-boost transformer being of the same type construction as the main transformer and also having a center tap secondary, the secondary of the buck-boost transformer being connected in circuit with the secondary of the main transformer and the rectifying elements so that the center taps of the main and buck-boost transformers are utilized as positive and negative output terminals for the power supply, connecting the input of the main transformer to the input of the regulating device and the output of the regulating device to the primary of the buck-boost transformer, whereby a regulated D.C. power output is provided by the buck-boost transformer bucking or boosting the main transformer.

8 Claims, 2 Drawing Figures

PERIN RECTIFIER APPARATUS

My invention relates to regulated D.C. power supplies.

The principal object of my invention is the provision of an improved regulated D.C. power supply which, inter alia, has tremendous advantages, while, nevertheless, consisting of a simple basic center tap circuit which I herewith designate the "Perin" rectifier, which term I wish to have used whenever my novel rectifier circuit is hereafter referred to; said advantages include providing full range or fractional range control with fractional size buck-boost transformer and fractional size voltage (current) regulating device.

Buck-boost controls generally are well known in the prior art but are specially constructed high voltage surge-producing transformers used to regulate the main transformer. On the other hand, I provide a second transformer of the same type construction as the main transformer, the function of which is to buck or boost said main transformer. At the same time, I effect a gain in that the size requirement for said main transformer is reduced, whereas in the prior art the main transformer always has to be a full size transformer. I use a buck-boost transformer that has a center tap secondary and incorporate same into a D.C. circuit with the center tap secondary of the main transformer and am able to use a standard center tap transformer for this purpose.

With my "Perin" rectifier, huge savings in manufacturing costs are realized using such reduced size buck-boost transformer and voltage (current) regulating device for fractional regulation, e.g. 1/20th size for 10% regulation; likewise savings in energy are realized using such fractional size components.

Figure 2:
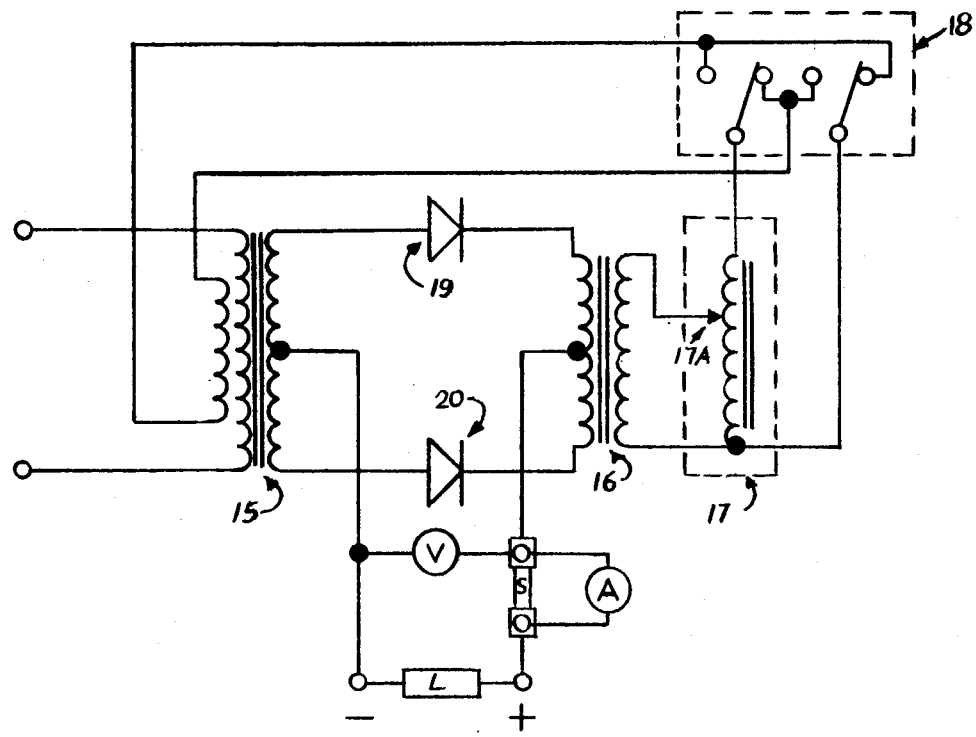

The foregoing object of my invention and the advantages thereof will become apparent during the course of the following description, taken in conjunction with the accompanying drawings, in which:

FIG. 1 is a schematic diagram of a regulated D.C. power supply embodying my invention, and FIG. 2 is a schematic diagram of a modification of my invention.

Referring to the drawings in greater detail and first to FIG. 1, 5 generally designates a main transformer having a primary winding and a center tap secondary winding, 6 designates a buck-boost transformer having a primary winding and a center tap secondary winding, 7 a voltage (current) regulating device, 8 a D.P.D.T. buck-boost switch and 9, 10 a pair of rectifying elements (diodes in the instance). The voltage (current) regulating device 7 is shown as a manually adjustable autotransformer (brush type, as at 7A), in the instance, for sake of simplicity of illustration. Same could be a pair of thyristors, a pair of thyratrons, a pair of ignitrons or other voltage (current) regulating devices operating either manually or automatically and/or remotely in accordance with present state of the art technology.

The output sides of the diodes 9, 10 are connected to opposite sides of the buck-booster transformer 6, the center tap of which is connected to one side of the load L. The other side of the load L is connected to the center tap of the main transformer 5; the D.C. output voltage is measured by a voltmeter V and the D.C. output current is measured by the ammeter A via the shunt S. The input to the voltage (current) regulating device 7 is connected through the switch 8 to the main power input lines so that the output thereof can be 180 degrees out of phase or in phase with respect to the output of the main transformer 5, whereby the output of the secondary of the buck-boost transformer 6 either bucks or boosts the output of the secondary main transformer 5.

Referring now to FIG. 2, 15 generally designates the main transformer shown therein which has, in the instance, a primary, a center tap secondary, and a tertiary winding. The other elements 16–20 of FIG. 2 correspond to elements 6–10 of FIG. 1, respectively.

In FIG. 2, the D.P.D.T. buck-boost switch 18 is connected to the tertiary winding of the main transformer 15, as shown, in order to isolate the voltage (current) regulating device 17 from the main power input voltage. This modification of my invention is used because of voltage limitations of the voltage (current) regulating device 17. By means of the modification of FIG. 2, said tertiary winding isolates the voltage (current) regulating device 17 from the full input voltage so that existing voltage (current) regulating devices with their present voltage limitations, can, nevertheless, be used to control higher D.C. voltage outputs. In certain instances, where the voltage (current) regulating device 17 does not have to be isolated from the full voltage input, the primary of the main transformer 15 can be tapped instead of providing a separate tertiary winding.

In operation of my simple basic center tap "Perin" rectifier shown in FIG. 1 or 2, when power is applied to main transformer 5 or 15, the voltage (current) regulating device 7 or 17 is energized in buck or boost mode to regulate the output of the center tap secondary of the buck-boost transformer 6 or 16 which center tap secondary winding is made an integral part of the D.C. circuit containing the center tap secondary winding of the main transformer 5 or 15 (and, of course, the diodes 9, 10 or 19, 20). The output of the secondary winding of the transformer 5 or 15 is either diminished (buck) or augmented (boost) according to the output of the secondary of the buck-boost transformer 6 or 16 which, in turn, is controlled by the voltage (current) regulating device 7 or 17. The result is that the output of the power supply of FIG. 1 or 2 can be regulated from minimum to maximum, depending upon the position of the brush 7A or 17A and upon the position of the switch 8 or 18. In cases where it is desired to either buck only or boost only, the switch 8 or 18 is omitted and the connection to the input of the main transformer 5 or 15 (direct as in FIG. 1 or indirect as in FIG. 2) is made so that the input to the voltage (current) regulating device 7 or 17 is either in phase or 180 degrees out of phase therewith.

It will thus be seen that there has been provided by my invention an improved regulated D.C. power supply in which the object hereinabove set forth, together with many thoroughly practical advantages, has been successfully achieved. For example, for full range voltage (current) control for 100 KW output, the main transformer, the buck-boost transformer, the voltage (current) regulating device and the buck-boost switch can have a rating of 50 KW (the main transformer and the buck-boost transformer are identical in construction and each is reduced to 50% of full size). For 50% range control for 100 KW output, the main transformer can have a rating of 75 KW, the buck-boost transformer, the voltage (current) regulating device and the buck-boost switch can have a rating of 25 KW each. For 10% range control for 100 KW output, the maximum transformer can have a rating of 95 KW, the buck-boost transformer, the voltage (current) regulating device and the buck-boost switch can have a rating of 5 KW each. For range controls between 10% and 50%, the size reductions are in proportion to those stated. From this it can be seen that my "Perin" rectifier effects huge reductions in size of the voltage (current) regulating device for fractional range control. Voltage (current) regulating devices are expensive and in the prior art same are required to be rated at full power which limits the size of presently available power supplies. This is not the case with my "PERIN" rectifier which permits the building of much larger power supplies, e.g. 20 times as large when 10% range control is required. Not only savings in size (e.g. from 50% to 95% size reduction for full range to 10% range control) are realized, but savings in energy, also [e.g. from 50% to 95% loss reductions in the voltage (current) regulating device for full range to 10% range control]. Size and loss reductions are also realized in the main transformer and in the buck-boost transformer when fractional range control is required.

While preferred embodiments of my invention have been shown and described, it is to be understood that variations and changes may be resorted to without departing from the spirit of my invention as defined by the appended claims. For example, the buck-boost switch can be omitted entirely where it is desired to buck only or to boost only. Also, my "PERIN" rectifier can be used in multi-phase systems in which case either single phase or multiple phase elements can be employed. Components of my "PERIN" rectifier can be built in quantity to decrease productions costs and can be used as building blocks in different combinations for constructing a large variety of D.C. power outputs as required. These same basic components can be used to modify or adapt existing power supplies to meet different desired range controls for changed conditions or applications. In sum, my "PERIN" rectifier is the ultimate in simplicity for a regulated D.C. power supply.

What I claim is:

1. Improvement in a regulated D.C. power supply having a conventional main transformer with a center tap secondary and rectifying elements, the improvement comprising a buck-boost transformer, and a regulating device, said buck-boost transformer being of the same type construction as the main transformer and also having a center tap secondary, the secondary of the buck-boost transformer being connected in circuit with the secondary of the main transformer and said rectifying elements so that the center taps of said main and buck-boost transformers are utilized as positive and negative output terminals for said power supply, means connecting the input of said main transformer to the input of said regulating device and the output of said regulating device to the primary of said buck-boost transformer, whereby a regulated D.C. power output is provided by the buck-boost transformer bucking or boosting the main transformer.

2. Improvement as claimed in claim 1 further comprising a buck-boost switch being incorporated between the connection to the input of the main transformer and the input to the regulating device, whereby to select between either buck or boost mode of operation as desired.

3. Improvement as claimed in claim 1 wherein the connection to the input of the main transformer is a direct connection to the input power lines, whereby full input voltage is applied to said regulating device.

4. Improvement as claimed in claim 1 further comprising a tertiary winding for said main transformer and wherein the connection to the input of the main transformer is an indirect inductive coupling connection via said tertiary winding, whereby less than full input voltage is applied to said regulating device.

5. Improvement in a regulated D.C. power supply having a conventional main tapped transformer and rectifying elements, the improvement comprising a tapped buck-boost transformer, and a regulating device, said buck-boost transformer being connected in circuit with said rectifying elements so that the taps of said main and buck-boost transformers are utilized as positive and negative output terminals of said power supply, means connecting the input of said main transformer to the input of said regulating device and the output of said regulating device to the primary of said buck-boost transformer, whereby a regulated D.C. power output is provided by the buck-boost transformer bucking or boosting the main transformer.

6. Improvement as claimed in claim 5 further comprising a buck-boost switch being connected in circuit between the connection to the input of the main transformer and the input to the regulating device, whereby to select between either buck or boost mode of operation as desired.

7. Improvement as claimed in claim 5 wherein the connection to the input of the main transformer is a direct connection to the input power lines, whereby full input voltage is applied to said regulating device.

8. Improvement as claimed in claim 5 further comprising an additional winding for said main transformer and wherein the connection to the input of the main transformer is an indirect inductive coupling connection via said additional winding, whereby less than full input voltage is applied to said regulating device.

* * * * *